(12) United States Patent
Grim, III et al.

(10) Patent No.: US 7,747,537 B2
(45) Date of Patent: *Jun. 29, 2010

(54) SYSTEM AND METHOD FOR PROVIDING A SECURE INTELLECTUAL PROPERTY MARKETPLACE

(75) Inventors: Clifton E. Grim, III, Seabrook, TX (US); Christopher I. Schmidt, Friendswood, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

This patent is subject to a terminal disclaimer.

(21) Appl. No.: 10/965,486

(22) Filed: Oct. 14, 2004

(65) Prior Publication Data
US 2006/0085360 A1  Apr. 20, 2006

(51) Int. Cl.
*G06Q 30/00* (2006.01)

(52) U.S. Cl. .............................. 705/67; 705/51; 705/44; 705/52; 705/53

(58) Field of Classification Search ................... 705/67, 705/44, 51–53; 700/90; 704/231; 708/100; 713/150–194
See application file for complete search history.

(56) References Cited

U.S. PATENT DOCUMENTS

| | | | | | |
|---|---|---|---|---|---|
| 5,629,980 | A | * | 5/1997 | Stefik et al. | 705/54 |
| 5,634,012 | A | * | 5/1997 | Stefik et al. | 705/39 |
| 5,715,403 | A | * | 2/1998 | Stefik | 705/44 |
| 5,892,900 | A | * | 4/1999 | Ginter et al. | 726/26 |
| 5,910,987 | A | * | 6/1999 | Ginter et al. | 705/52 |
| 6,055,573 | A | * | 4/2000 | Gardenswartz et al. | 709/224 |
| 6,182,050 | B1 | * | 1/2001 | Ballard | 705/14 |
| 6,334,109 | B1 | * | 12/2001 | Kanevsky et al. | 705/14 |
| 6,338,050 | B1 | | 1/2002 | Conklin et al. | |
| 6,438,690 | B1 | * | 8/2002 | Patel et al. | 713/156 |
| 7,120,800 | B2 | * | 10/2006 | Ginter et al. | 713/193 |
| 7,124,302 | B2 | * | 10/2006 | Ginter et al. | 713/189 |
| 7,133,845 | B1 | * | 11/2006 | Ginter et al. | 705/51 |
| 7,213,005 | B2 | * | 5/2007 | Mourad et al. | 705/64 |
| 7,249,059 | B2 | * | 7/2007 | Dean et al. | 705/26 |
| 2001/0007979 | A1 | | 7/2001 | Teshima | |
| 2001/0025255 | A1 | | 9/2001 | Gaudian | |
| 2001/0049651 | A1 | | 12/2001 | Selleck | |
| 2002/0046127 | A1 | | 4/2002 | Reding et al. | |
| 2002/0107803 | A1 | * | 8/2002 | Lisanke et al. | 705/51 |
| 2002/0107812 | A1 | | 8/2002 | Schimitzek | |
| 2002/0128935 | A1 | | 9/2002 | White et al. | |
| 2002/0183867 | A1 | | 12/2002 | Gupta et al. | |

(Continued)

*Primary Examiner*—Ella Colbert
*Assistant Examiner*—Hai Tran
(74) *Attorney, Agent, or Firm*—Anna Linne; Roberts Mlotkowski Safran & Cole, P.C.

(57) ABSTRACT

A system and method for providing an intellectual property marketplace (IM) using a secured information vault so that individual owners of intellectual property (IP) may control and manage the access and dissemination of the IP. Producers of the IP may also receive compensation for transactions in the marketplace. Multiple services for adding IP such as books, movies, video, papers, research, music, inventions, or the like, to the IM include controlling authorized access to the IP and generation of advertising based on types of IP in order to solicit potential consumers. Transactions may be securely transacted using public keying infrastructure (PKI). Consumers subscribing to the IM may also be automatically notified when IP is added to the IM based on predetermined preferences established by the consumer.

38 Claims, 12 Drawing Sheets

U.S. PATENT DOCUMENTS

2003/0083961 A1* 5/2003 Bezos et al. .................. 705/27
2003/0204447 A1* 10/2003 Dalzell et al. ................. 705/26
2003/0204449 A1 10/2003 Kotas et al.
2004/0133793 A1* 7/2004 Ginter et al. ................ 713/193
2006/0069611 A1* 3/2006 Litt et al. ..................... 705/14

* cited by examiner

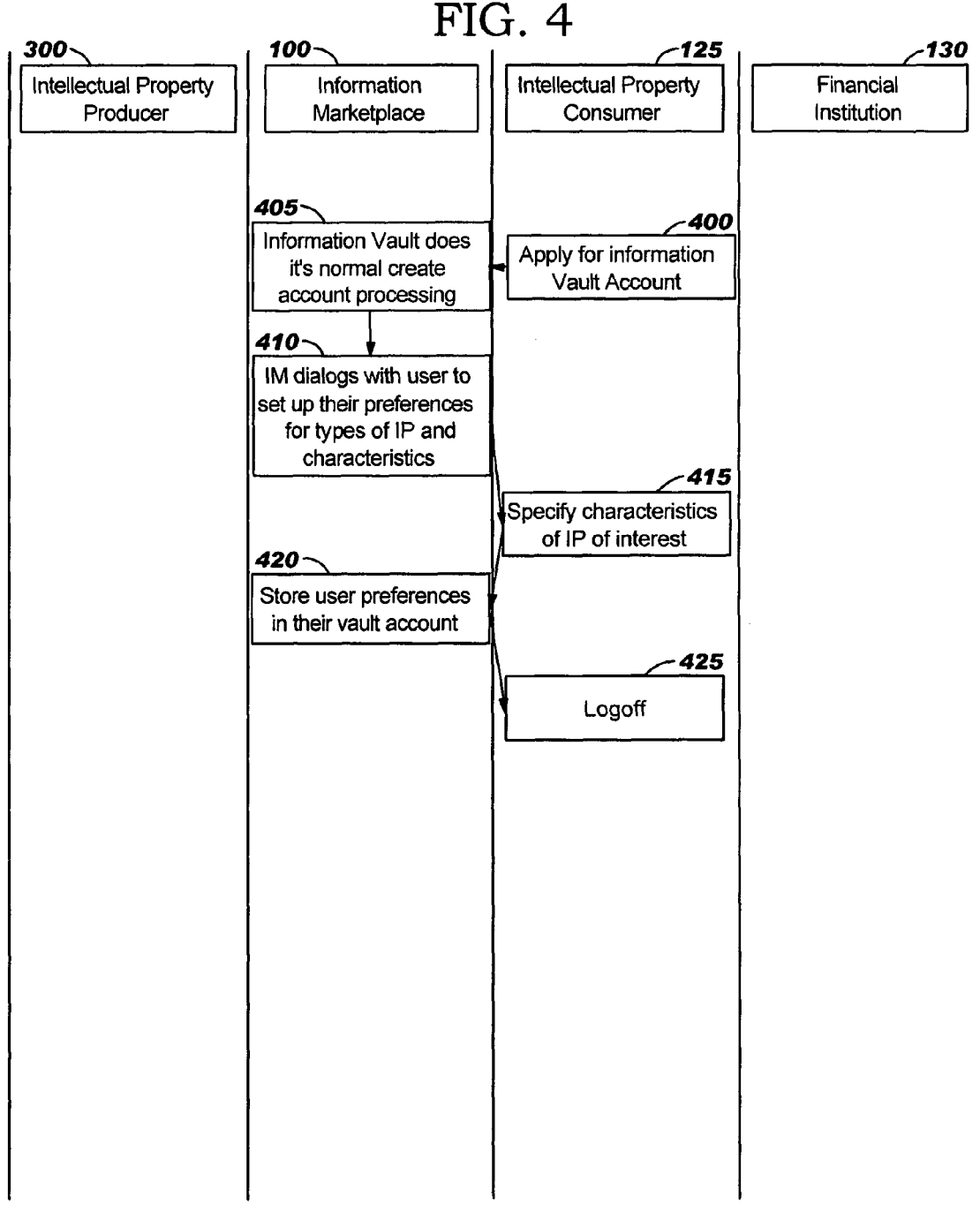

SYSTEM AND METHOD FOR PROVIDING A SECURE INTELLECTUAL PROPERTY MARKETPLACE

CROSS REFERENCE TO RELATED APPLICATIONS

This application is being filed concurrently with related co-pending U.S. patent application Ser. No. 10/965,592, which is now incorporated by reference in its entirety herein.

DESCRIPTION

1. Field of the Invention

The invention generally relates to a system and method for a secure intellectual property marketplace and, more particularly, to a system and method for a secure intellectual property marketplace for securely buying and selling intellectual property using an information vault.

2. Background Description

As the world becomes more wired and electronic storage becomes cheaper than the cost of paper, the protection of information such as intellectual property (IP) becomes paramount. The ease with which information can be copied and propagated causes serious information privacy issues. Keeping information safe and secure is thus one of the biggest issues facing the information technology (IT) industry and the owners of the IP today.

There are several areas of concern regarding the protection of information including the danger of unrecoverable loss of the information itself and defense against unauthorized copying of the digital information. Also, the control of access to the information may pose certain risk factors to the owner of the information and to the thousands of other organizations who hold copies of this information for business reasons. Ultimately, there may be a potential loss of financial opportunity based on the use of the information.

Currently, there is a great amount of information generated by individuals and organizations. This IP takes the form of music, digital photographs, movies, stories, articles, white papers, research, or the like. At this point in time, there exists no general, secure or commercial viable system or method to facilitate the exchange of this IP. That is, there is no marketplace where one individual or an organization may place for sale their IP.

Further, unauthorized replication of information is a serious problem and may be illustrated with the notion of information theft of video or music. While it is unlikely that the illicit copying of digital objects may be completely eradicated, original access to IP needs to be more tightly controlled. For example, music, movies, stories, papers, research, and photographs needs to be managed so that privacy is maintained more rigorously. Additionally, the transit of this IP needs to be protected, as well as facilitated.

The Internet may be a system to share IP, but it does not control the sharing of IP, nor does the Internet provide for the security of the property. Further, the Internet does not act as a repository for allowing the collecting and organization of the IP. Ultimately, it does not have mechanisms to provide a marketplace for the IP information that allows a consumer to procure the information from an information seller.

There are filtering systems that allow peers to trade information, but not in a commercial manner. Copies of others' IPs are freely passed back and forth between users without any compensation to the actual owners of the IP. eBay®, for example, provides a virtual marketplace of sorts, but it is an "option based" system and also does not allow the direct online transfer of digital IP.

iTunes® and other online music down load companies own a collection of music IP and sell this direct to consumers. Also, Apple® buys the rights for published music and then sells the music. However, Apple does not provide for an individual to create a piece of IP, put it up for sale in a digital information marketplace, and receive compensation for the IP.

Ultimately, information such as IP is valuable. The illicit use of IP could cause financial loss to the owner or confer an unfair advantage to another party. For example, organizations may collect IP and sell it on the open market. The individual who owns this information (i.e., the person themselves) is never directly or indirectly compensated; instead, the information compilers or middlemen essentially take IP and sell the information. Not only does the individual not get compensated for the middlemen's and advertisers' use of the information but they also may lose control of the IP information privacy.

SUMMARY OF THE INVENTION

In an aspect of the invention a secure information marketplace system is provided. The system comprises data storage which securely stores IP, associated with an account holder and a deposit system which securely deposits the IP into the data storage. The system also comprises an access system which accesses the IP stored in the data storage and an IP withdrawal system which retrieves the IP stored in the data storage.

In another aspect of the invention, an information marketplace system is provided. The information marketplace comprises at least one component to create an account in an information vault, securely deposit IP in the information vault and to associate the IP with the account, access the IP in the information vault and advertise the IP to potential consumers of the IP.

In another aspect of the invention, a method of providing an IP repository is proved. The method comprises the steps of accessing an information vault to perform a transaction involving an item of IP stored in the information vault, authenticating an identity of an user accessing the item of IP and executing the transaction when the identity of the user is authenticated.

In another aspect of the invention, a method of charging for information is provided. The method comprises authenticating a owner depositing IP in a secure information marketplace, depositing IP by the owner into the secure information marketplace and advertising the IP to attract a customer. The method also comprises transacting a sale of the IP with the customer, wherein the customer is authenticated, providing the IP to the customer and charging the customer a fee for the IP.

In another aspect of the invention a computer program product comprising a computer usable medium having readable program code embodied in the medium is provided. The computer program product includes at least one component to access an information vault to perform a transaction involving an item of IP stored in the information vault, authenticate an identity of an entity performing the accessing and execute the transaction when the identity of the entity is authenticated.

BRIEF DESCRIPTION OF THE DRAWINGS

FIG. 4 is a swim lane diagram showing steps of an embodiment of a new IP consumer registering at the IM;

DETAILED DESCRIPTION OF EMBODIMENTS OF THE INVENTION

This invention is, generally, in one embodiment, directed to a system and method for providing a secure information marketplace (IM) to facilitate the exchange of intellectual property (IP). The system and method also provides for the owner of the IP to receive compensation for the use or sale of IP, thus, in effect, the IP becomes a valuable commodity. The invention provides a business model that allows commercial transactions between owners of the IP and consumers of the IP. This may involve a one-time sale or subscription access to the IP.

IP producers may create information like digital photographs, music, movies, eBooks, composition, research, or the like. The marketplace of the invention provides for the IP producer to bring their creations to an IM that provides an ability for IP producers to advertise and sell their material. The IM provides for the safety and security of the IP, and manages the interaction of a buyer and seller by facilitating finding information (i.e., IP) by the buyer. The IM also handles the financial transaction between the IP owner and the buyer, and also facilitates transport of the IP product to the buyer/consumer. In this way, the system and method of the invention enables IP producers to sell their own intellectual wares.

Figure 1:
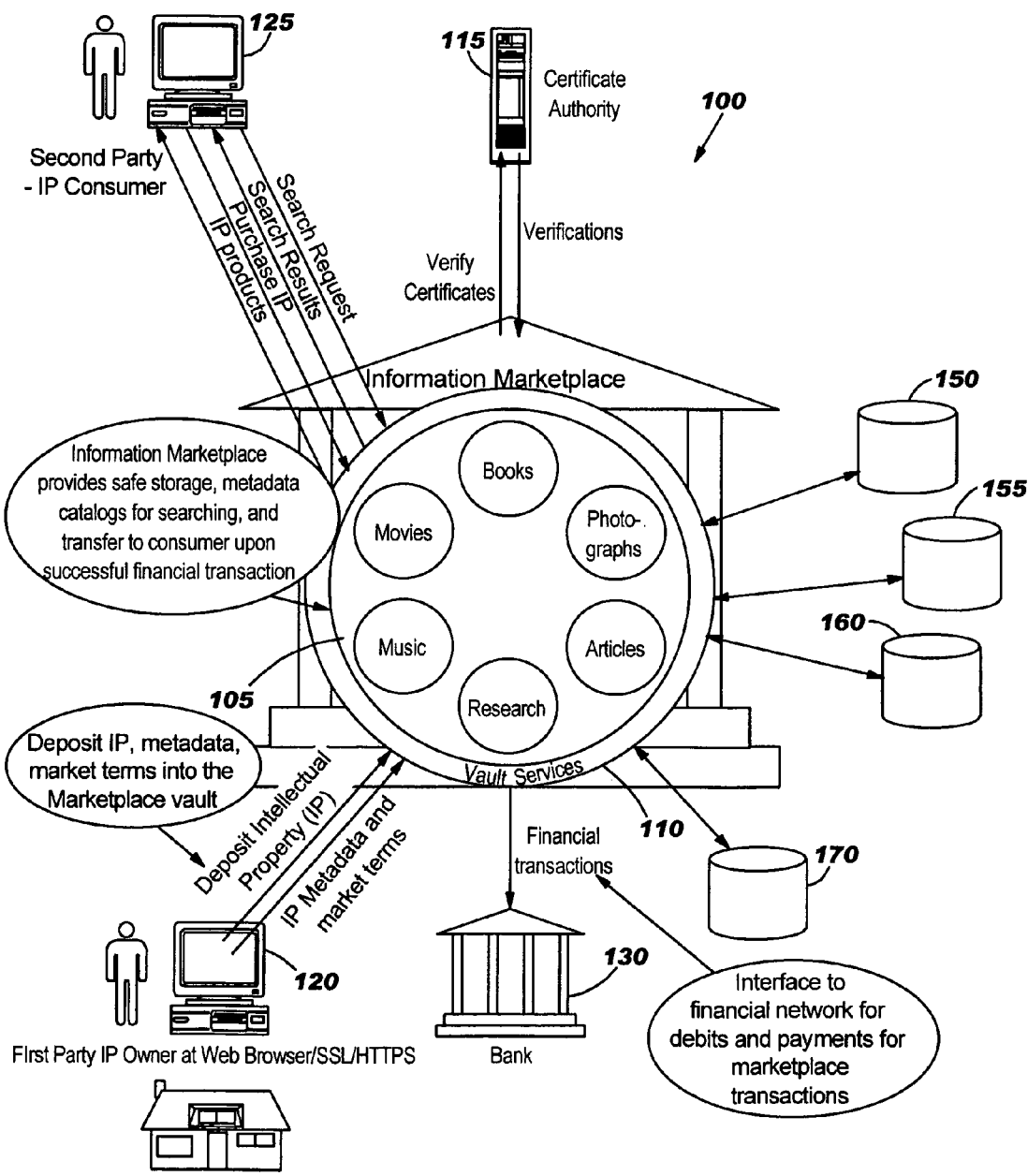
FIG. 1 is an exemplary overview of an embodiment of the invention.

FIG. 1 is an exemplary overview of an embodiment of the invention. An IM generally denoted by reference numeral 100, provides for an information infrastructure to secure and conditionally provide access to stored IP information. The IM 100 employs data storage 105 and security technologies to provide a secure storage mechanism for a user's IP, such as for example, books, movies, articles, music, research, photographs, inventions, software, or the like. The data storage 105 may be one or more physical databases and, in embodiments, may include the databases, as described below. This secured storage mechanism and associated services are also known as an information vault, or simply, a vault. A computer system 120 (e.g., a personal computer) may be employed by a user to read or remove IP from the vault or to deposit IP information to the vault over a network.

A set of vault of services 110 are built on the IM's secure storage, to allow users to create accounts, deposit information in any electronic form, and read or remove the information. Information may be stored in the vault and encrypted by the vault. In addition, the IM vault services 110 are provided to allow a user (e.g., an IP producer) to specify conditions, in a secure way via technologies of the existing public key infrastructure (PKI), so that a second party 125 (e.g., a consumer of IP) may have read access to certain, sharable portions of the user's IP.

A certificate authority 115 may create an authorized certificate (e.g., a digital certificate) for any user of the system which may be presented during transactions to facilitate authenticating a user. Accesses to the vault typically use the first and/or second party's public keys as identification along with the authorized certificate. To share information with a second party, a contract data token specifying the two parties' public keys may be created and digitally signed by the first party's private key to ensure that access to private information is not propagated beyond the second party. This dual key mechanism is a typical way to authenticate a transaction, of which an example of an implementation may be found in co pending U.S. patent application Ser. No. 10/965,592.

With this approach, the first party may provide the second party 125 permission to read an agreed upon set of IP such as articles, research, books, music, video, data or the like. As a trusted third party for information, then, the information vault 100 significantly contributes to the elimination of the escalating dangers of theft, and significantly increases commercial availability of the IP overall. The IM of the invention may also provide for financial transactions and payment collection upon sale of the IP, as denoted by reference numeral 130.

Further, the IM 100 may comprise one or more databases that may be protected by layers of firewalls. Some of the functional databases (which may be one or more physical databases and/or may be inherently a part of the data storage 105) include an IM indices database 150, an advertising configuration database 155, an ad database 160, a subscription database 170 and perhaps others, as described more fully below.

Figure 2:
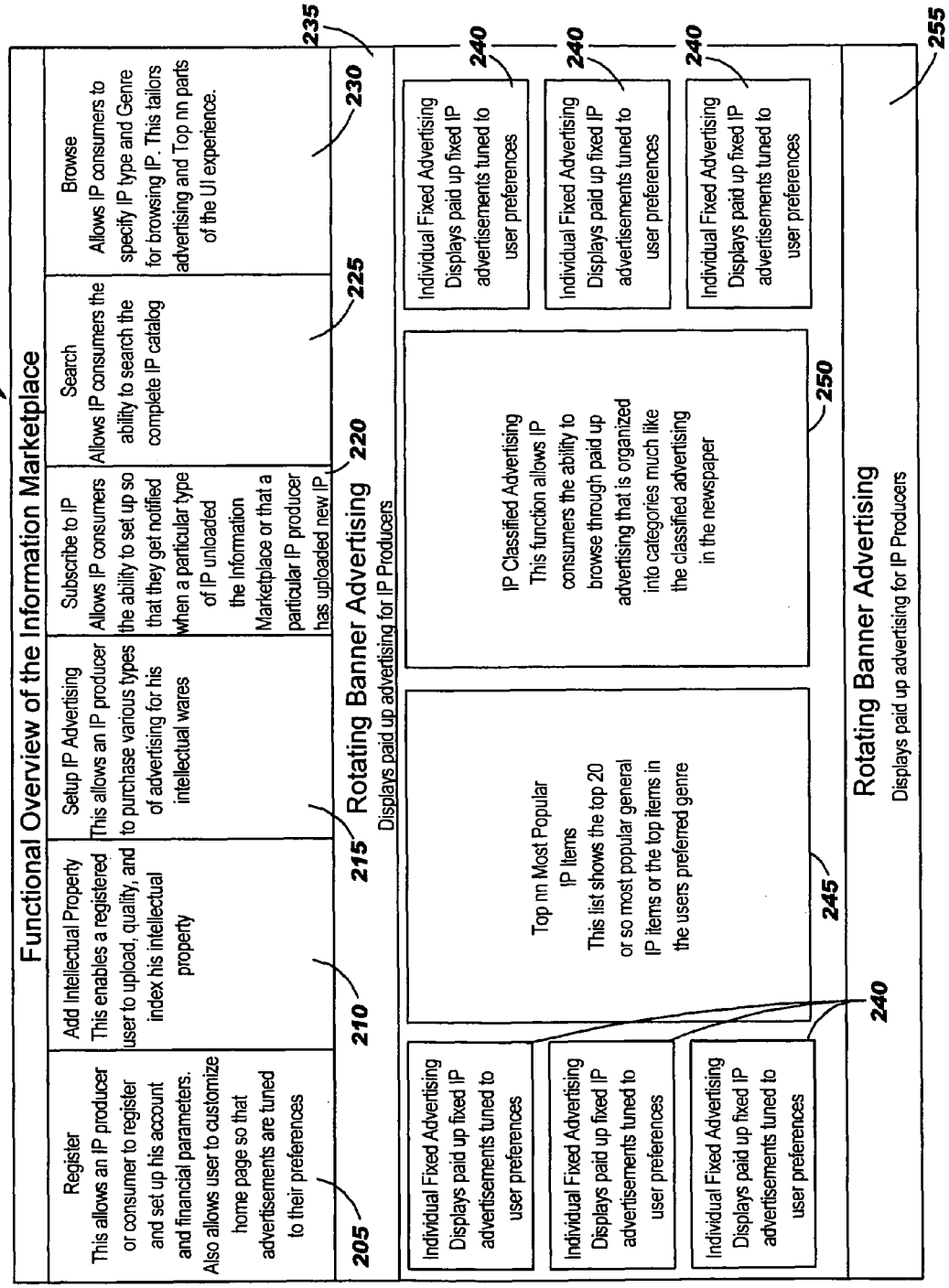
FIG. 2 is a functional overview of the information marketplace (IM)

FIG. 2 is a functional overview of the information marketplace, generally denoted by reference numeral 200. The functional overview 200 shows how a user of the information marketplace system may perform many of the associated functions from registering with the system to adding IP to advertising and selling the property, as described more in detail below. A register function 205 allows an IP producer or consumer to register with the IM 100 as well as set up their account including financial parameters. This function may also allow a user to customize a home page so that advertisements are tuned to their preferences.

Also, the IM 100 may provide a vault function 210 for adding IP to enable a registered user to upload, qualify, and index their IP. Once the IP is uploaded to the IM, the IP may be qualified so that appropriate indexes and schema may be populated to support the search capabilities of the IM. For example, a user may add a music item to the vault, identify it as rock and roll, and index the music by title, author or type of music for searching and retrieval purposes. Also, an advertising function 215 (e.g., a service) may be provided for subscribing to advertising that provides IP producers options for directing the IM to deliver advertisements in various forms, including for example, fixed ads, banner ads, classified ads, or the like. In addition, consumption statistics (e.g., counts of viewed or sold IP objects) may also be maintained in order in one or more databases for the IM to present to potential buyers the most popularly consumed IP in various categories. Essentially, the consumption statistics track, on a per IP item basis, the frequency rate of viewed IP and/or sold IP.

Additionally, a subscribe function 220 (e.g., a service) may also be provided by the invention for subscribing to IP which allows an IP consumer the ability to set up and specify criteria when they may be notified when a particular type of IP is uploaded to the IM 100 or that a particular IP producer has up loaded new IP. A search function 225 to search the IM 100 is also provided, which allows IP consumers the ability to search a complete IP catalog. Further, a browse function 230 is provided which may allow IP consumers to specify IP types and genre parameters for browsing and/or searching for categories, classes or type of IP. For example, a user may desire to search for books, fiction, and/or "books-on-tape", perhaps specifying an English language version.

The IM 100 of the invention may also provide potential and actual consumers of the IP to have the option to respond to advertising, review the most popular items, e.g., search via the IM indexes, and subscribe by producer or type of IP. Also, in embodiments, emails or similar notification systems may notify the customers of new IP that fits their interests. Once an item is found, the IM 100 may assist in the financial transaction between the producer and consumer and may implement the various terms of the agreement. For example, an authorized consumer may submit a payment for completing a transaction and the IM 100 may verify the payment and convey the purchased IP item to the consumer.

To this end, the functional overview 200 of the invention, in embodiments, may include individual fixed advertising 240 which may display paid-up fixed IP advertisements tuned to a user's preference. For example, a consumer may indicate interests in folk music and any paid-up fixed advertisement (by folk music IP producers) which in turn may be displayed to the consumer dynamically. Also, as denoted by reference numeral 245, advertising may be provided for the top nn (nn being an integer) most popular IP items. This type of preferred advertising may list, for example, the top 20 most popular general IP items or the top items in the user's preferred genre. The advertisement list may update periodically as popularity changes by adding, removing, or changing order of items. The list is maintained dynamically using consumption statistics, as described below.

Further, the IM 100 of the invention may also provide IP classified advertising 250 that allows IP consumers to browse through paid up advertising that is organized into categories analogous to classified advertising in a newspaper. Also, rotating banner advertising 255 may be provided so that displays of paid up advertising for IP producers may be made available. As a result, the information marketplace of the invention may provide for:

- a new IP producer to register to use the IM;
- a new IP consumer to register to use the IM;
- a registered user to upload their IP to the repository. The upload user interface provides for facilitating the upload of IP and its indexing;
- organizing an index to the IP, as described below;
- IP producers to advertise their property;
- IP consumers to subscribe and to be notified of new IP content that meets their interest;
- parties interested in the property to find/search the IP;
- a user to download the IP; and/or
- charging a fee to the consumer of the IP, which may be split between the information marketplace and the IP producer.

Figure 3:
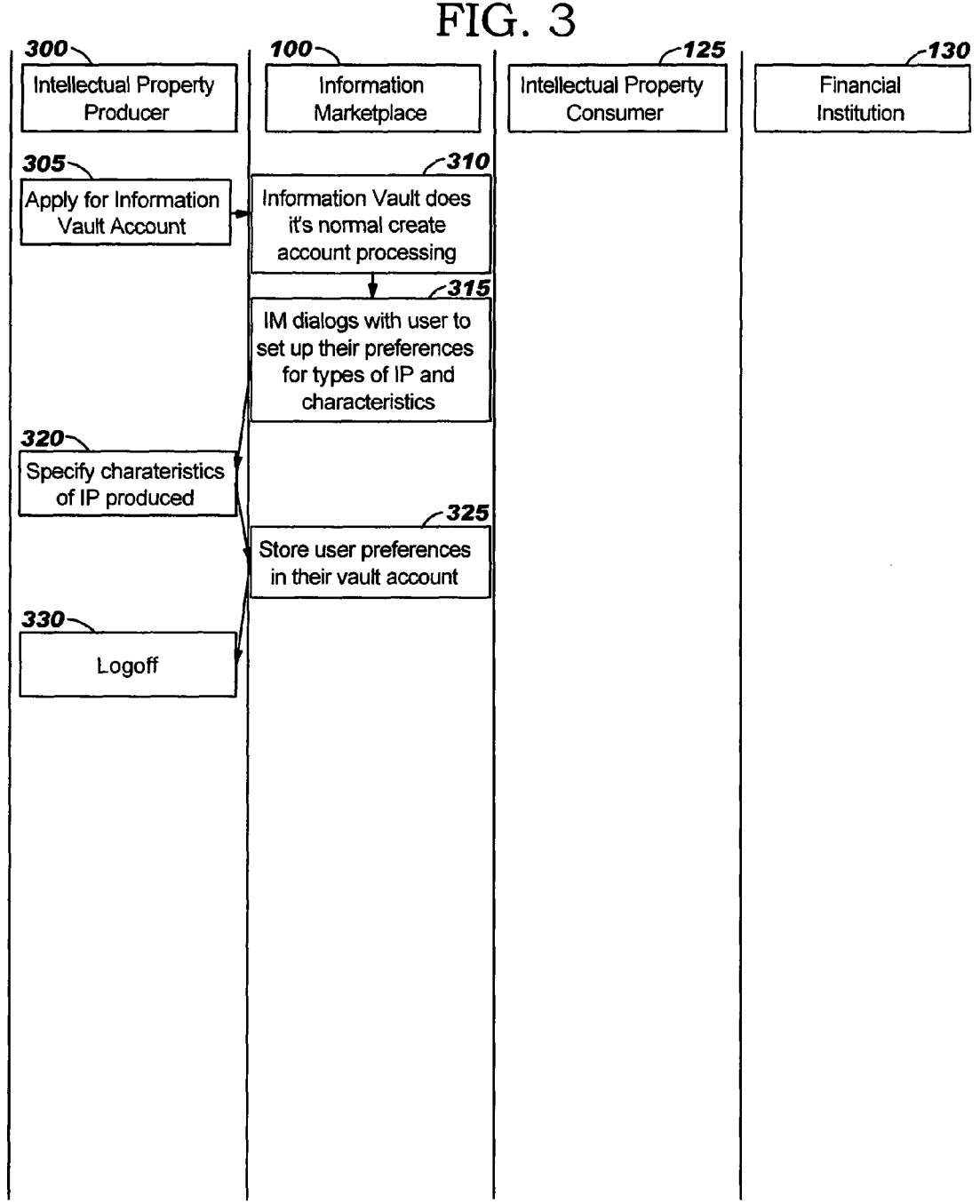
FIG. 3 is a swim lane diagram showing steps of an embodiment of registering a new IP user.

FIG. 3 is a swim lane diagram showing steps of an embodiment of registering a new IP user. "Swim lane" diagrams show the relationship between the various "actors" in the processes and the steps involved in the processes. FIG. 3 (and all the other swim lane Figures) may equally represent a high-level block diagram of components of the invention implementing the steps thereof. The steps of FIG. 3 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane Figures) may be implemented using the embodiment of FIG. 1.

Referring to FIG. 3, three swim lanes are shown, including a lane for an IP producer 300 (e.g., computer 120 with associated user). Also included is a swim lane for the information marketplace 100, IP consumer 125, and a financial institution 130. At step 305, the IP producer 300 may apply for an information vault account. At step 310, the information vault of the information marketplace 100 may create the account. This account creation may include securely authenticating the user (e.g., by a digital certificate and one or more witnesses) of the IM 100 for identity, financial and data security purposes.

At step 315, the IM 100 may dialog with the IP producer to set up the preferences for types of IP (such as music, videos, books, etc.) and associated characteristics (jazz, rock and roll, etc, or, for books, fiction, biography, etc.). These preferences may be used as defaults during the indexing process when the IP producer adds IP to the vault. At step 320, the IP producer may specify one or more characteristics of the IP produced. At step 325, the information marketplace may store the user preferences in the IP producer vault account. At step 330, the IP producer 300 may logoff.

FIG. 4 is a swim lane diagram showing steps of an embodiment of a new IP consumer registering at the information marketplace. Four swim lanes are shown including an IP producer 300, an IM 100, IP consumer 125 and financial institution 130. At step 400, an IP consumer 125 may apply for an information vault account. At step 405, the information vault of the information marketplace 100 may create an account for the IP consumer 125, an example of an implementation may be found in co-pending U.S. patent application Ser. No. 10/965,592.

At step 410, the IM 100 may dialog with the IP consumer 125 to set up preferences for types of IP (e.g., video, music, or the like) and characteristics (e.g., wide-screen video, exercise videos, jazz music, classical music or the like). At step 415, the IP consumer 125 may specify the characteristics of the interested IP. At step 420, the information marketplace 100 may store the IP consumer's 125 preferences in the IP consumer's vault account. At step 425, the IP consumer 125 may logoff.

Figure 5A:
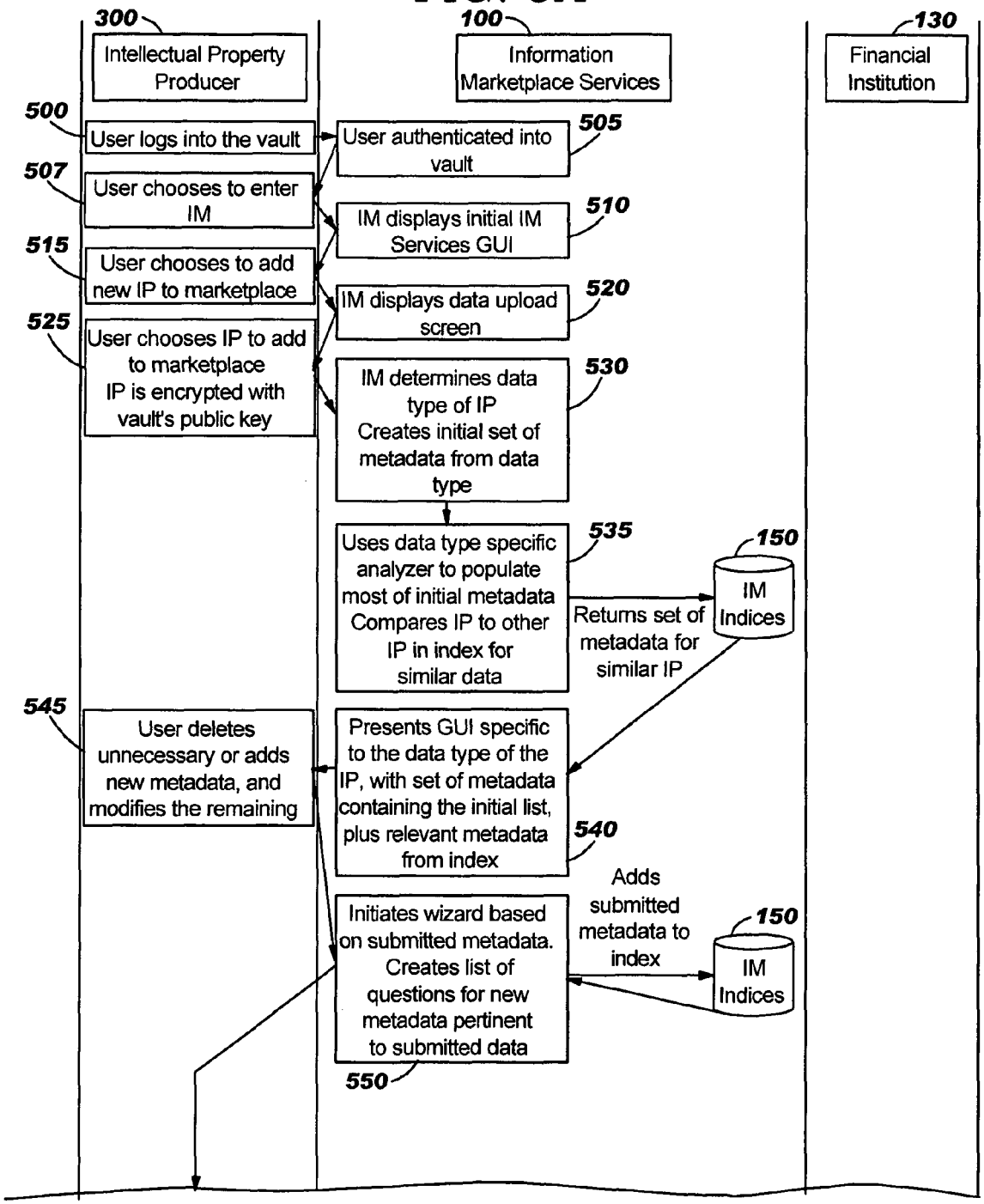
FIGS. 5A and 5B (hereinafter referred to as "FIG. 5") depict a swim lane diagram showing steps of an embodiment of adding IP into the IM.
Figure 5B:
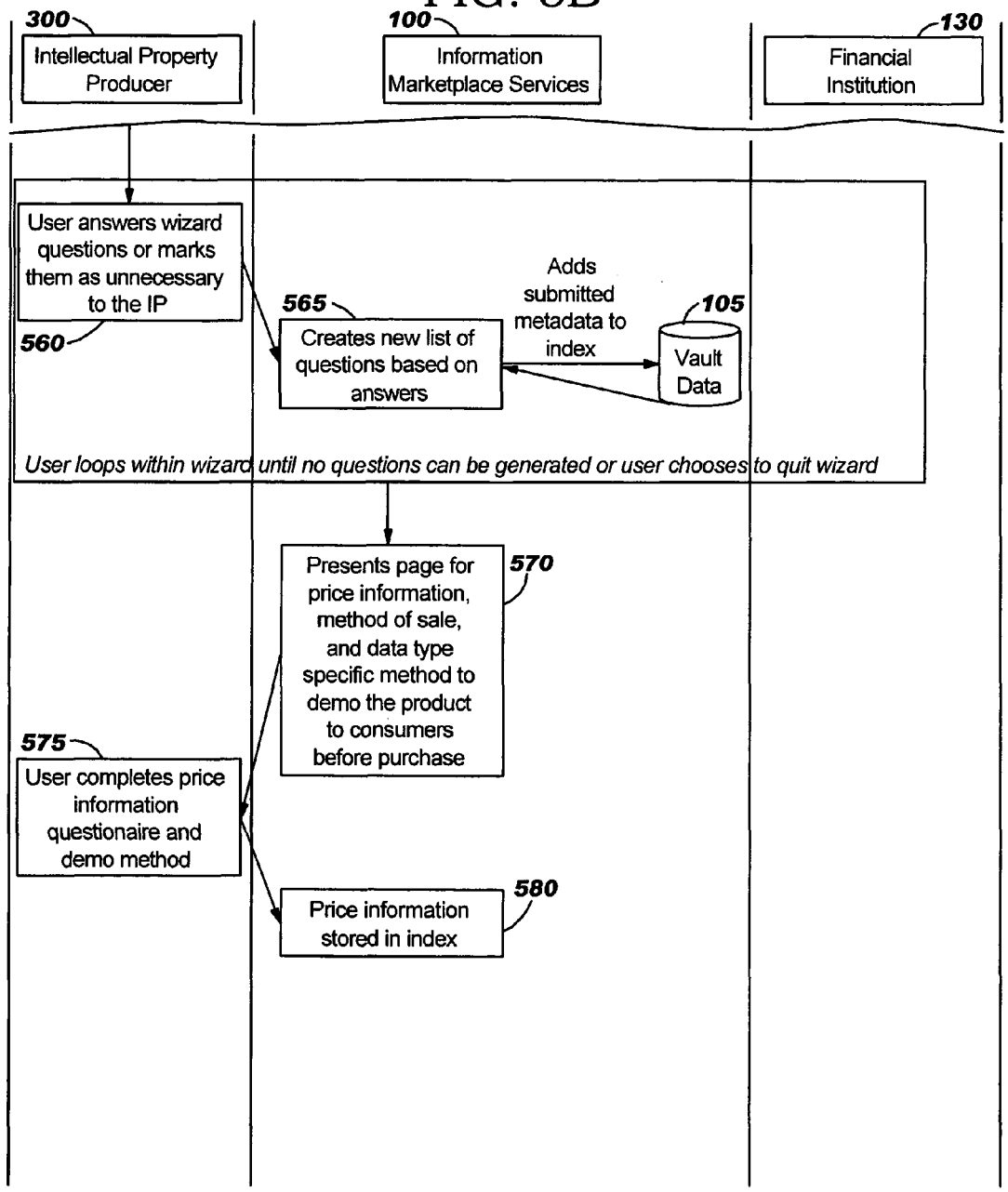

FIG. 5 is a swim lane diagram showing steps of an embodiment of adding IP into the IM. Three swim lanes are shown including IP producer 300, IM services 110, and a financial institution 130. At step 500, an IP producer 300 may log into the vault. At step 505, the IP producer may be authenticated into the vault by the IM services 110. At step 507, the IP producer 300 may choose to enter the IM. At step 510, the IM 100 may display an initial IM services graphical user interface (GUI) showing an option for adding new IP, for example. At step 515, the IP producer 300 may choose to add new IP into the IM. At step 520, the IM 100 displays a data upload screen via the GUI. The data upload function of the GUI displays choices for selecting IP items and format. Also, the GUI facilitates and optimizes the upload by packaging the IP item according to the type of format such as video, text, audio, or the like. Selection of latest industry formats may automatically occur as appropriate for the type of IP. Alternatively, in embodiments, the IP producer 300 may also indicate a particular format type from the GUI.

At step 525, the IP producer chooses IP to add to the marketplace. The IP is typically encrypted with the vault's public key and sent to the information marketplace 110. At step 530, the IM 100 may determine the data type of the IP determined (e.g., music, music file, static image, text, or the like) and may create an initial set of metadata from the data type. At step 535, the IP services 110 may analyze the data once it has been received and the type of the data. Each data type may have a different analyzing engine to discover attributes from the IP.

The analyzing engines may cull basic information from the IP, for instance, audio length, picture size, number of pages, overall file size, etc. Based on the type, a core set of metadata may be populated, with much of the data typically being generated by the analyzer.

An additional analysis may also be performed to compare the new IP with other similar IP in the information marketplace. For example, metadata for IP that is similar in the IM index 150 to the new IP may be collected with the core set of metadata. At step 540, the IM services 110 may present a GUI specific to the data type of the IP, with a set of metadata containing an initial list, plus any relevant metadata from the IM index 150. At step 545, the IP producer may view both the core set of metadata and the potential matched metadata. The IP producer may then have an option to remove metadata that is not pertinent, add additional metadata that is pertinent, or adjust values in the metadata. The IP producer 300 may submit the modified metadata list to the IM.

At step 550, the IM services 110 may add the submitted metadata to the IM index database 150. The IM 100 may initiate a content "wizard" to create more metadata for the new IP. Based on the initial metadata and type of data, the wizard may present the user with questions about the data. For instance, if the IP is a static photograph, and the IP producer entered landscape or nature in previous metadata values, the IM 100 may then ask for the geographic location of the photo subject matter. As a result, the wizard's questions may create more metadata which may make the IP easier to find by consumers. For each question, the index 150 may be updated.

At step 560, the IP producer may continue to be given questions until all questions are asked or the user elects to stop the process. The questions may also be marked as unnecessary. At step 565, a new list of questions may be created based on the responses received. Any generated metadata may then be added to the vault data 105 when the wizard completes, when the IP producer terminates the wizard or when no more questions are generated.

At step 570, the information marketplace services 110 may present a page for price information, method of sale and/or data type specific method to demonstrate how the product will be viewed by consumers before purchase. At step 575, the IP producer 300 completes the price information questionnaire and may select a demonstration method. At step 580, the information market place services 110 stores the "demo" information and/or price information in the index 150. The IP may now be available for sale.

Figure 6:
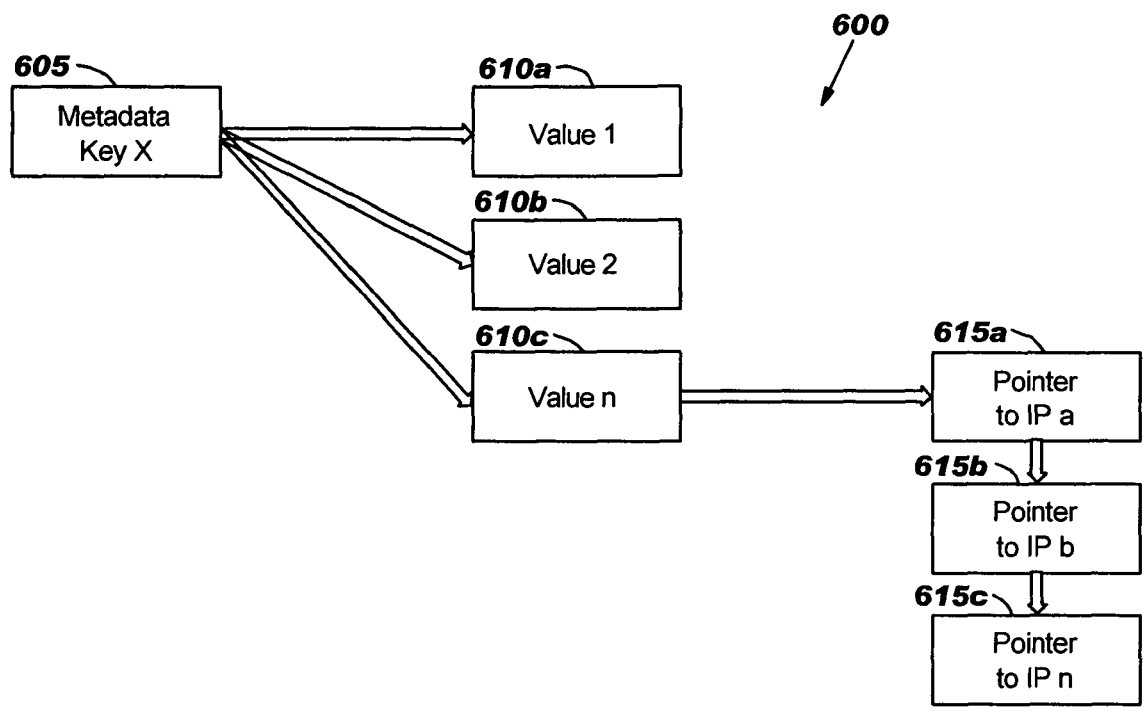
FIG. 6 is an illustrative embodiment of indices to IP stored in the IM.

FIG. 6 is an illustrative embodiment of indices to IP stored in the information marketplace, generally denoted as reference numeral 600. The one or more indices for the information marketplace may be collections of key/value pairs and pointer(s) to IP stored within the IM 100 vault. For example, metadata key X, 605, may link to associated values 610a-610c, each value 610a-610b reflecting a distinctive type of data such as, for example, movies, plain text, music, pictures, or the like. Further, the values 610a-610c may also categorize IP by genre such as "jazz', "classical", "rock and roll", or other types of music, for example. Each value 610a-610c may link to a list of one or more pointers 615a-615c to individual IP objects. The order of the list may reflect the popularity of IP within the list (e.g., consumption statistics, such as the number of sells and views for a particular IP, may promote the IP higher in the list).

The individual indices may have a core set of metadata, or a template that pertains to a type of data. The template may map to standard metadata that the IP may have within the vault. In addition, to the core templates, additional metadata pairs may be created to specify individual IP more thoroughly. The indices may also store (or link to) the number of times a specific piece of IP has been purchased. This statistic may be a reasonable indicator of the popularity of a piece of IP.

Figure 7:
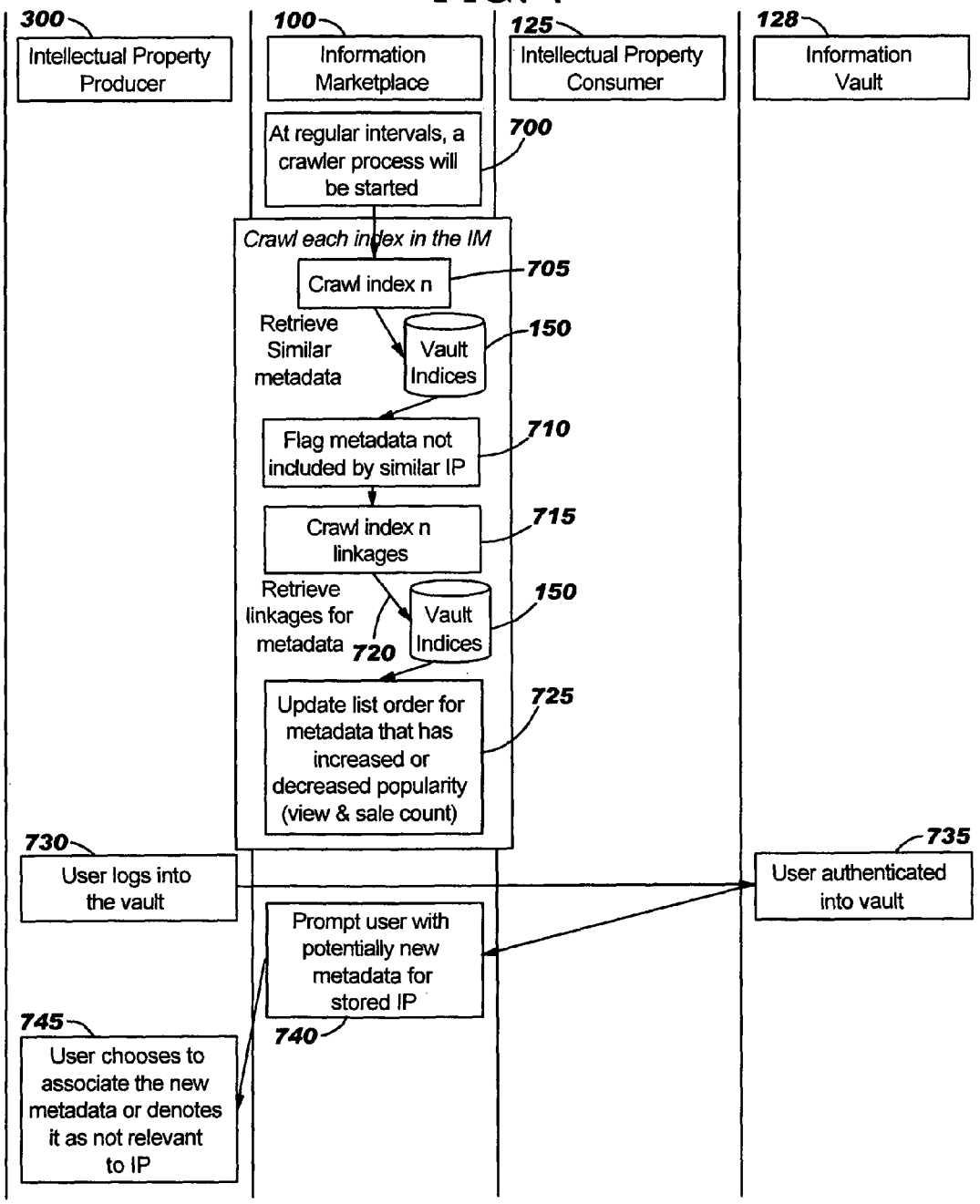
FIG. 7 is swim-lane diagram showing steps of an embodiment for crawling through the IM indices.

FIG. 7 is swim-lane diagram showing steps of an embodiment for crawling through the IM indices. The swim lane includes an IP producer 300, IM 100, IP consumer 125, and information vault 128. At step 700, at regular intervals or predetermined time periods, the IM 100 initiates a crawler process, a generally known concept for traversing database linkages, which is typically a part of the vault services 110. At step 705, for each index, 1-n, in the IM, the crawler process (e.g., a thread) crawls each index in the vault indices looking for similar IP metadata sets. IP that has similar metadata sets may have high probability of being similar in nature and, therefore, metadata that is included by one IP may potentially be applied to the other. For example, consider two pictures, each having the same type (e.g., landscape) and location (e.g., historical ruins in London). One picture may have metadata on type of ruin (castle, Roman settlement, or the like) that may pertain to the other, or at the least, could help further describe the other picture. Likewise, similar association may be performed with a music file. Similar genres may have common sets of metadata for culture, rhythm, or even performance location, for example.

At step 710, when similar metadata is discovered (and has not already been included by related IP), the crawler may flag the potential metadata keys so that the IP producer may denote, at a later time, whether the similar metadata is applicable. At step 715, all linkages may be crawled for each index 1-n. At step 720, linkages for metadata may be retrieved, as necessary, from the vault indices database 150. At step 725, the list order of metadata or IP objects may be updated to reflect an increase or decrease in popularity based on views and/or sales counts.

At step 730, typically asynchronous to the crawler process, an IP producer 300 may log into the IM 100 vault and may be authenticated (e.g., by presenting a digital certificate). At step 735, the IP producer may be authenticated for access to the information vault 128. At step 740, the IM 100 may display and prompt the IP producer with any new potential metadata that has been discovered that may enhance or add to the definition/description of stored IP object(s) as discovered during the crawling process. At step 745, the IP producer may choose to associate the new metadata with an IP object(s) or, alternatively, denote that the metadata is not relevant to the IP. The process ends.

Figure 8:
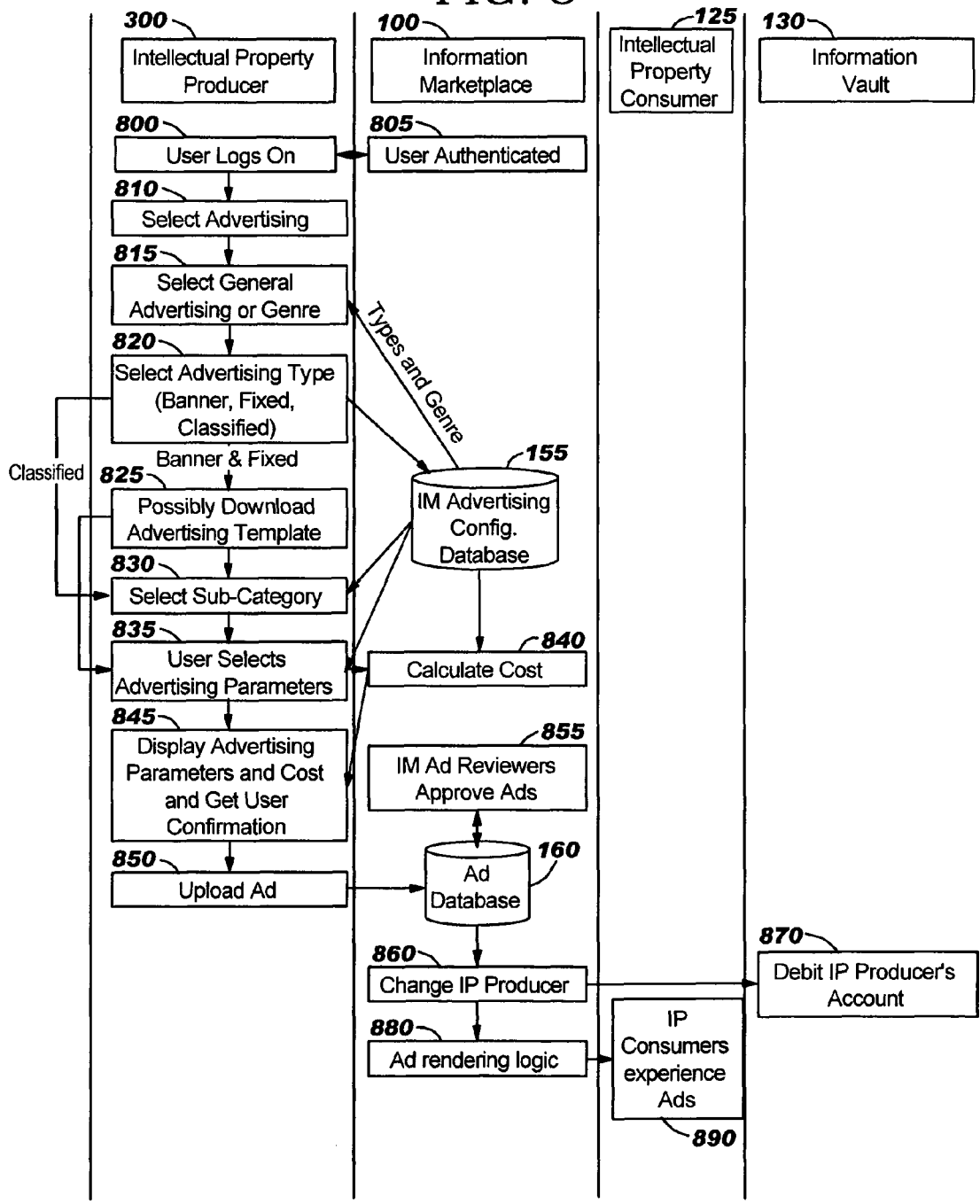
FIG. 8 is a swim lane diagram showing steps of an embodiment of setting up IP advertising.

FIG. 8 is a swim lane diagram showing steps of an embodiment of setting up IP advertising. Four swim lanes are shown, including IP producer 300, information marketplace 100, IP consumer 125, and financial institution 130. At step 800, the IP producer 300 may log onto the IM. At step 805, the IP producer 300 may be authenticated by the information marketplace, an example of an implementation may be found in co-pending U.S. patent application Ser. No. 10/965,592. At step 810, the IP producer 300 may select an option for setting up advertising. At step, 815, the IP producer 300 may select a type of advertising such as general advertising or a particular genre. These types/genres may be contained or stored in the IM advertising configuration database 155.

At step 820, the IP producer 300 may select an advertising type such as banner, fixed or classified. If the type selected is banner or fixed, then at step 825, the IP producer may possibly download an advertising template. The process then continues at step 835. If, however, classified is selected, then at step 830, the IP producer may select a sub-category of the classified appropriate for the IP. The sub-categories may be retrieved from the IM advertising configuration database 155, as well. At step 835, the intellectual producer 300 may select advertising parameters such as length of time for the advertisement or frequency.

At step 840, the information marketplace 100 may calculate a cost associated with the selected advertising parameters. At step 845, the advertising parameters and associated cost may be displayed to the IP producer 300 and a confirmation may be requested from the IP producer. At step 850, the IP producer may select to upload the advertisement to the IM 100. At step 855, information advertisement reviewers may independently approve the ads that the user has selected. The advertisement is typically stored in an advertisement database 160.

At step 860, the IP producer may be charged a fee. At step 870, a debit may be made to the IP producer's account. At step 880, the ads may then be rendered out in different ways based upon the advertisement type. Banner ads may be rendered out to IP consumers at the site based on the consumer's preferences and IP producer's products. So, as examples, a consumer interested in "Blues" genre of music may have a "Blues" producer's banner advertisement displayed. Classifieds may also be displayed as consumers search classified categories. Dedicated ads may be displayed for any renderings of the IM website.

At step 890, an IP consumer 125 may experience one of the ads, as appropriate. Typically, the experience may occur, for example, due to the IP consumer surfing or searching the IM website or perhaps due to a generalized search and positive hit for a particular key word associated with an object in the IM, or the like.

Figure 9:
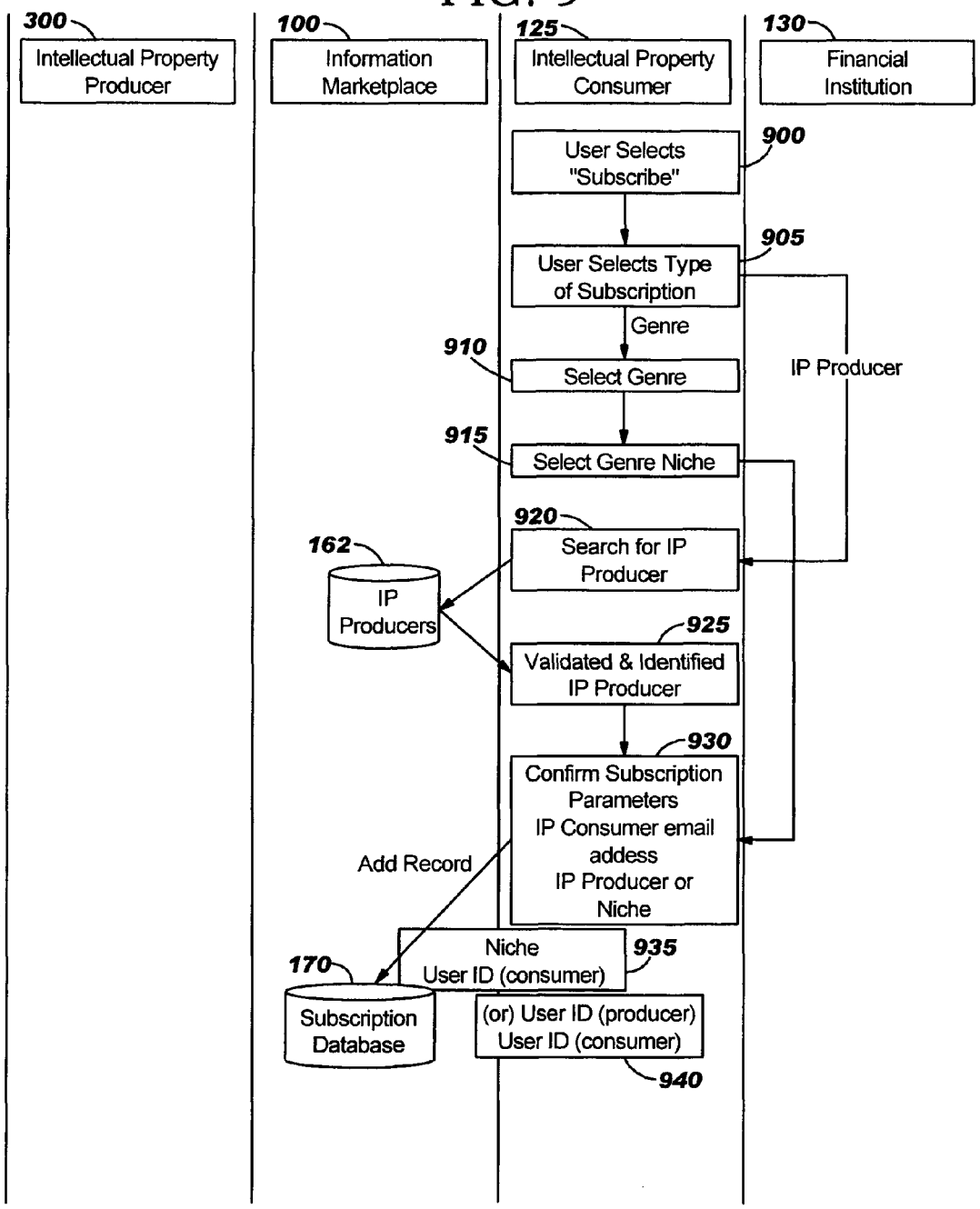
FIG. 9 is a swim lane diagram showing steps of an embodiment of subscribing to IP.

FIG. 9 is a swim lane diagram showing steps of an embodiment of subscribing to IP. The swim lane includes lanes for an IP producer 300, an IM 100, an IP consumer 125 and financial institution 130. Once a user is registered with the IM, the user may subscribe for notification of content additions to the IM 100 that they might be of interested. At step 900, an IP consumer 125 may select to subscribe to the IM. This may be accomplished by logging onto the IM website. At step 905, the IP consumer 125 may select the type of subscription. This may include a genre or a particular IP producer that they may be interested in, for example.

At step 910, the IP consumer may select a genre. At step 915, the IP consumer may select a genre niche. The process then continues at step 930. If, however, at step 905, the user selects IP producer as the type of subscription, then at step 920, the IP consumer 125 may choose to search for an IP producer. This typically involves searching an IP producer's database 162 maintained by the IM. At step 925, the selected IP producer may be validated and identified. At step 930, the IP consumer may be asked to confirm the subscription parameters such as the IP consumer's email address and/or whether they have chosen the IP producer or the genre niche type of subscription.

At step 935, if the genre niche has been chosen, then the User ID of the IP consumer 125 may be added to the subscription database along with the genre type/niche. Or, at step 940, if the type of subscription chosen was for a particular IP producer, then the User ID of the IP consumer and IP producer may be added to the subscription database. A fee may also be charged for this service. All of this information may be stored in the subscription database 170 so that notifications may be sent out to subscribing consumers when new contents are added to the IM. The process ends.

Figure 10:
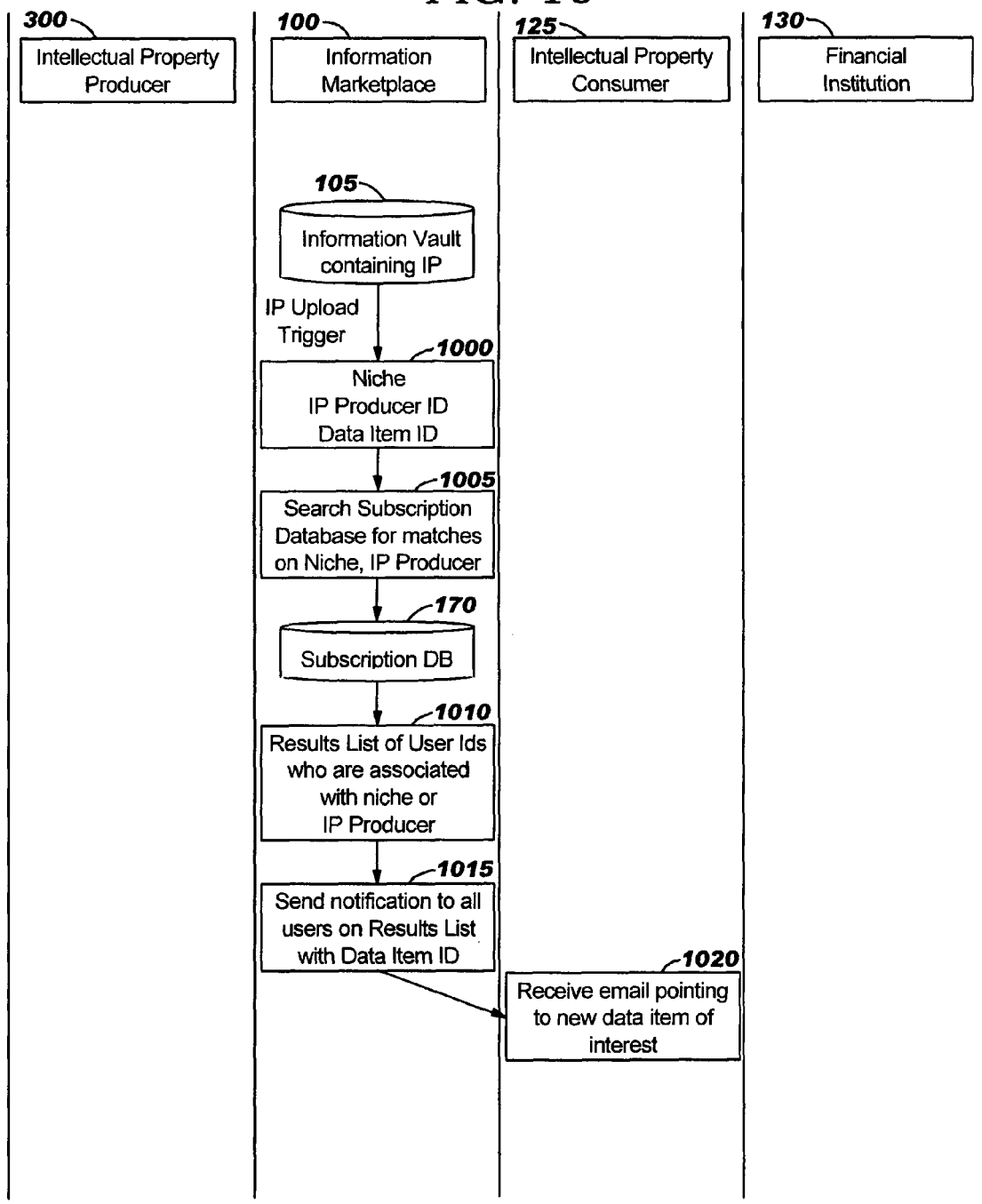
FIG. 10 is a swim lane diagram showing steps of an embodiment of subscription notification.

FIG. 10 is a swim lane diagram showing steps of an embodiment of subscription notification. Four swim lanes are shown including IP producer 300, IM 100, IP consumer 125 and financial institution 130. Shown also as part of the IM 100, is the information vault 105 containing IP. Asynchronously, IP may be updated in the information vault 105 as described previously, which may then trigger a notification to anyone who has a subscription either to the IP producer or to the type, genre, or niche associated with the IP item.

Referring to FIG. 10, at step 1000, the IM 100 isolates the data item ID, IP producer ID, type, genre, and/or niche or other pertinent information associated with the IP update. At step 1005, the IM 100 searches the subscription database 170 for matches on the type, genre, niche or IP producer as obtained from the updated IP. At step 1010, the IM 100 creates a list of user IDs associated with the type, genre, niche or IP producer. That is, the resulting list includes any IP consumer that has indicated an interest in a particular type, genre, niche or a particular IP producer. At step 1015, the IM 100 may send a notification to all the users on the list. At step 1020, the IP consumers receive an email or other appropriate communication alerting the consumer to the new data item of interest. A fee may also be charged for this service.

Figure 11:
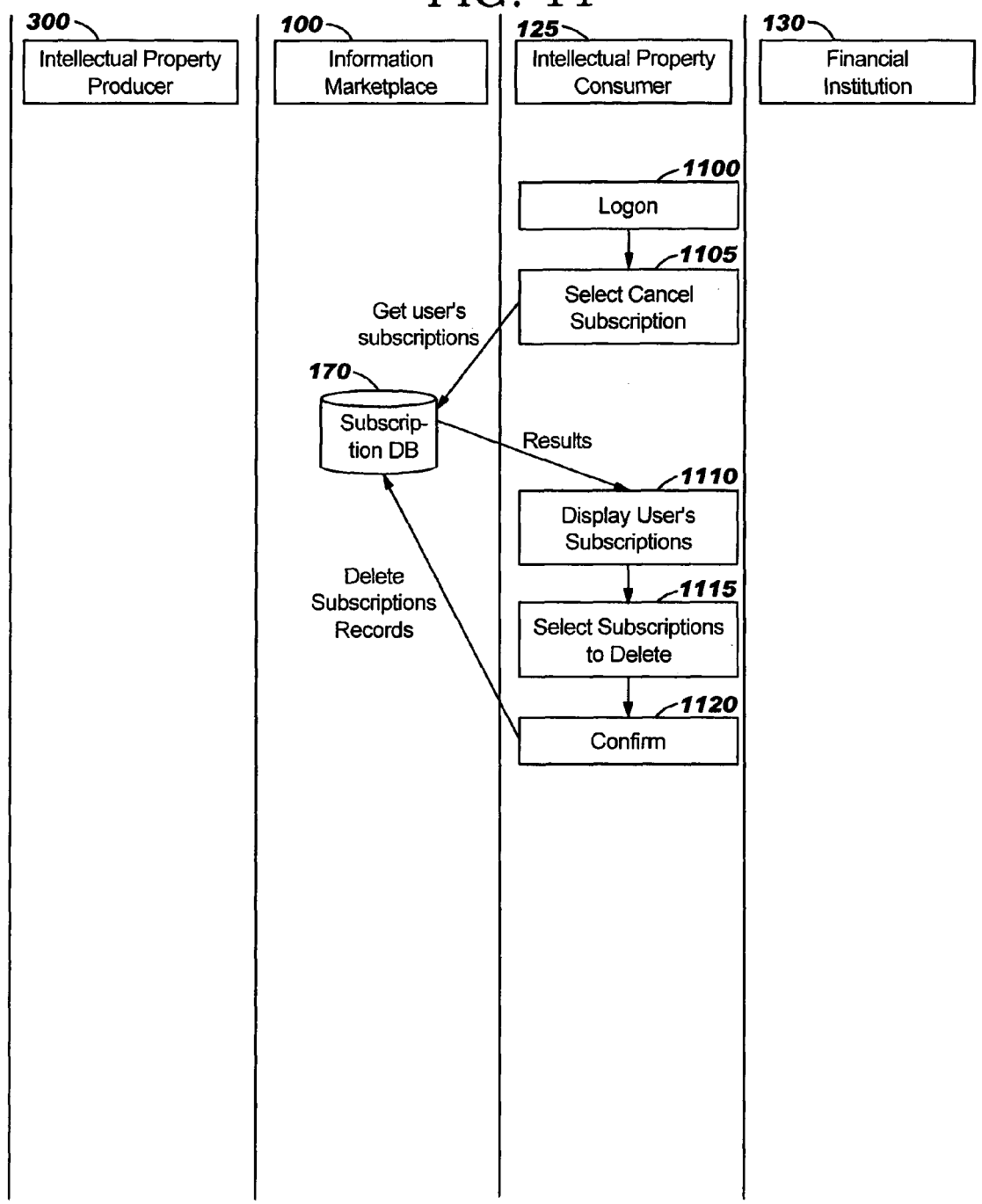
FIG. 11 is a swim lane diagram showing steps of an embodiment of canceling subscriptions.

FIG. 11 is a swim lane diagram showing steps of an embodiment of canceling subscriptions. The swim lane diagram includes IP producer 300, information marketplace 100, IP consumer 125 and financial institution 130. At step 1100, the IP consumer 125 may logon to the IM 100 and may be authenticated. At step 1105, the IP consumer 125 may select to cancel a subscription, perhaps from a GUI. This may cause a query into the information marketplace 100 subscription database 170 to locate subscriptions associated with the IP consumer 125. At step 1110, the IP consumer's subscriptions may be displayed. At step 1115, the IP consumer may select to delete one or more subscriptions. At step 1120, the IP consumer may be prompted to confirm the deletion choices. Upon confirmation, the selected subscriptions may be deleted in the subscription database 170. A fee may also be charged for this service. The process ends.

EXAMPLE OF USING THE INVENTION

Once indices have been populated with metadata information for IP, a user(s) may search for data (i.e., IP) to purchase. The IM 100 may present the user options to search all IP or narrow the search to a specific type of IP (e.g., movie, plain text, music, etc.). The system and method may allow a user to enter a phrase similar to web search engines, or create a search query based on the metadata associated with the data types.

For searching by phrase, the system of the invention may break up the phrase into components and determine if any words match metadata key/value pairs in the indices. For phrases that match a metadata key, IP associated with that key may be included in a result set. Phrases that match actual values may include only the IP that is in the key/value linkage. IP that may be found under multiple hits may be placed higher in the result set. IP that has been viewed and sold more times than others may also be placed higher in the results set. The final result may be a list of potential IP with the first items in the list matching the user's search criteria and being more popular than remaining listed items.

When searching by attributes, the system and method of the invention may present the user a customized GUI for the data type specified. The user may initially see the core template metadata for the data type, but may be able to add new fields by selecting metadata that has been created by other users of the system. Once the user(s) has chosen the set of metadata keys, query terms may be entered. Once parameters are submitted, the system may search the specific metadata chosen for associated IP.

From the result set screen(s), the user(s) may select an IP and begin a process of purchasing the IP, or the user(s) may choose to use wizard functionality. The wizard functionality, similar to IP creation, based on metadata search criteria, may suggest to a user to search other metadata keys/values that have a high occurrence rate. For instance, if a user(s) had searched for music in the genre of jazz, the wizard may realize that many sound files with genre of jazz also have a high occurrence of a New Orleans location. The wizard may then prompt the user with a choice to search for more music from New Orleans.

While the invention has been described in terms of embodiments, those skilled in the art will recognize that the invention may be practiced with modifications and in the spirit and scope of the appended claims.

What is claimed is:

1. A secure information marketplace system, comprising:
   data storage which securely stores intellectual property (IP), associated with an account holder;
   a deposit system which securely deposits the IP into the data storage;
   an access system which accesses the IP stored in the data storage;
   an IP withdrawal system which retrieves the IP stored in the data storage; and
   an advertising system for generating interest in the IP in the data storage, wherein the advertising system includes a classified advertising system, a fixed advertising system, a banner advertising system, and a preferred advertising system based on popularity statistics,
   wherein the classified advertising system organizes ads based on categories,
   the fixed advertising shows advertisements tuned to a user preference;
   the banner advertising system is a rotating banner advertisement system for displaying ads for IP producers; and
   the preferred advertising system periodically updates content of an advertised advertisement based on popularity of the IP in the ad.

2. The system of claim 1, wherein the data storage, the deposit system, the access system, and the IP withdrawal system are services of an information vault and each service is accessible via a network.

3. The system of claim 1, wherein the deposit system, the access system and the IP withdrawal system include a dual key security mechanism to authenticate a transaction.

4. The system of claim 1, further comprising a charging system for charging a user a fee for at least any one of a deposit of the IP into the data storage, a withdrawal of the IP from the data storage, a transaction, subscribing to a service, and an access to the IP in the data storage.

5. The system of claim 1, wherein the data storage stores the IP associated with the account holder including at least any one of a music item, a video item, a movie, a book, a research paper, an article, a composition, an invention, software, an information item, and a photograph.

6. The system of claim 1, further comprising an advertising system for generating interest in the IP in the data storage.

7. The system of claim 6, wherein the advertising system includes at least any one of a classified advertising system, a fixed advertising system, a banner advertising system and a preferred advertising system based on popularity statistics.

8. The system of claim 7, wherein:
   the classified advertising system organizes ads based on categories and the fixed advertising shows advertisements tuned to a user preference;
   the banner advertising system is a rotating banner advertisement system for displaying ads for IP producers; and
   the preferred advertising system periodically updates content of an advertised advertisement based on popularity of the IP in the ad.

9. The system of claim 1, further comprising a secure transaction system that recognizes a first party and a second party, the first party being the account holder and the second party being another user given access to the IP by the first party.

10. The system of claim 9, wherein the secure transaction system provides for the second party to access the IP and controls the functions that the second party may perform with the IP.

11. The system of claim 1, wherein at least one of the deposit system, the access system and IP withdrawal system authenticates one or more users involved in a transaction.

12. The system of claim 1, wherein the deposit system stores preferences of the account holder and stores specified characteristics associated with the IP.

13. The system of claim 1, further comprising a registration system for registering a user to access an information vault and authenticates the user and stores preferences of the user relating to IP of interest to the user.

14. The system of claim 1, further comprising a mechanism for creating metadata to link with the IP, wherein at least any one of the mechanism:
   (i) prompts the account holder with questions to create the metadata, and
   (ii) presents metadata to the user from a stored template to create the metadata.

15. The system of claim 1, further comprising:
   a subscription system to register a user to a service for monitoring the IP being added to an information vault based on one or more preferences of the user; and
   a notification system for notifying the user when the service detects an added IP matching the one or more preferences of the user.

16. The system of claim 1, further comprising a crawler system for crawling an information vault's indices to locate metadata similar to metadata associated with the IP of the account holder and for reporting the similar metadata to the account holder wherein the similar metadata has at least one value or phrase in common.

17. An information marketplace system comprising:
   a physical database for data storage; and
   at least one component comprising a combination of computer program code and hardware, the at least one component structured and arranged to:
   create an account in an information vault;
   securely deposit IP in the information vault and to associate the IP with the account;

access the IP in the information vault; and
advertise the IP to potential consumers of the IP,
wherein the advertising includes a classified advertising system, a fixed advertising system, a banner advertising system, and a preferred advertising system based on popularity statistics,
the classified advertising system organizes ads based on categories,
the fixed advertising shows advertisements tuned to a user preference,
the banner advertising system is a rotating banner advertisement system for displaying ads for IP producers, and
the preferred advertising system periodically updates content of an advertised advertisement based on popularity of the IP in the ad.

18. The system of claim 17, comprising the at least one component to authenticate one or more parties during a transaction performed by the information vault to permit access to the information vault.

19. The system of claim 17, comprising the at least one component to:
charge for transactional activity involving the IP;
subscribe to a service for monitoring types of IP being added to the information vault based on preferences of a subscriber; and
notify the subscriber when added IP to the information vault matches the preferences.

20. The system of claim 19, wherein the preferences include at least one of an IP producer identifier, a genre type identifier and an IP type.

21. The system of claim 17, further comprising a metadata structure having a key/value pair having one or more linkages including a list of one or more pointers to the IP.

22. The system of claim 17, further comprising a crawler system for searching one or more indices to the IP in the information vault to discover similar IP metadata associated with the indices, similar IP metadata having at least one common value or phrase and wherein the crawler system marks similar discovered IP metadata so that a user may associate at least one similar discovered metadata with at least one IP item based on the marked IP metadata.

23. A computer-implemented method of providing an IP repository, comprising the steps of:
providing a system structured and arranged to allow a user to access an information vault to perform a transaction involving an item of IP stored in the information vault;
authenticating an identity of a user accessing the item of IP;
presenting to the user options to search all IP or a specific type of IP stored in the information vault;
receiving a search query from the user;
wherein the system generates a results set of IP based upon the search query and metadata, wherein the result set is ordered such that IP items having multiple hits are placed relatively higher in the result set, and IP items that have been viewed and sold more times than others are also placed relatively higher in the result set;
presenting the result set to the user; and
executing the transaction when the identity of the user is authenticated.

24. The method of claim 23, wherein the item of IP includes at least any one of a music item, a video item, a movie, a book, a research paper, an article, a composition, software, an invention, an information item, and a photograph.

25. The method of claim 23, further comprising the steps of:
creating a digital certificate for an applicant who owns or controls the item of IP;
accessing the information vault to create an account associated with the applicant and presenting the digital certificate as identity of the applicant; and
depositing the item of IP into the account.

26. The method of claim 23, wherein the authenticating step authenticates the identity of the user employing a trusted third party authenticator.

27. The method of claim 23, wherein the accessing step includes at least any one of depositing the item of IP, reading the item of IP, removing the item of IP, deleting an account, selecting advertising for the item of IP and viewing the item of IP.

28. The method of claim 23, further comprising the steps of:
subscribing to a service to monitor the information vault for an added item of IP which satisfies a preference associated with the user; and
notifying the user when the added item of IP satisfies the preference.

29. The method of claim 23, further comprising the steps of advertising the item of IP.

30. The method of claim 29, wherein the advertising includes one of a banner ad, a fixed ad, a classified ad, and a preferred ad based on popularity statistics and wherein the classified ad organizes ads based on categories and the banner ad is a rotating banner for displaying IP producers and wherein the fixed ad is tuned to a user preference and the contents of the preferred ad is periodically updated based on popularity of IP in the ad.

31. A computer-implemented method of charging for information comprising:
providing a system structured and arranged to authenticate an owner depositing IP in a secure information marketplace;
depositing IP by the owner into the secure information marketplace;
wherein the system advertises the IP to attract a customer;
transacting a sale of the IP with the customer, wherein the customer is authenticated;
providing the IP to the customer; and
charging the customer a fee for the IP,
wherein the advertising comprises:
maintaining consumption statistics that track, on a per IP item basis, a frequency rate of viewed IP and sold IP;
providing a list or N most popular IP items to the customer, where N is an integer; and
dynamically maintaining the list by adding, removing, or changing an order of IP items on the list based upon the consumption statistics.

32. The method of claim 31, wherein the IP is encrypted using a public key of the secure information marketplace.

33. The method of claim 31, further comprising the steps of:
applying for an information marketplace account by the customer; and
storing IP preferences of the customer in the account.

34. The method of claim 31, further comprising the steps of:
defining a type of IP to facilitate advertising and searching of the IP;
specifying a type of advertisement for advertising the IP;
creating metadata based on attributes of the IP to facilitate searching; and
storing the metadata in the secure information marketplace and associating the metadata with the IP.

35. The method of claim 31, further comprising subscribing to a service for notifying a subscriber of the service when additional IP is added to the secure information marketplace based on one or more preferences established by the subscriber, wherein the subscriber is the customer.

36. The method of claim 35, further comprising canceling a subscription to the service.

37. A computer program product comprising a storage medium having readable program code embodied in the medium, the computer program product includes at least one component to:
  access an information vault to perform a transaction involving an item of IP stored in the information vault;
  authenticate an identity of an entity performing the accessing;
  present to the user options to search all IP or a specific type of IP stored in the information vault;
  receive a search query from the user;
  generate a results set of IP based upon the search query and metadata, wherein the result set is ordered such that IP items having multiple hits are placed relatively higher in the result set, and IP items that have been viewed and sold more times than others are also placed relatively higher in the result set;
  present the result set to the user; and
  execute the transaction when the identity of the entity is authenticated,
  wherein the computer program product is implemented with a system structured and arranged to execute the transaction.

38. The computer program product of claim 37, wherein the computer program product further includes at least one component to permit a user viewing the result set to select a selected IP and begin a process of purchasing the selected IP.

* * * * *